UNITED STATES PATENT OFFICE.

ERWIN E. A. G. MEYER AND GEORGE W. SEIBERLING, OF DETROIT, MICHIGAN, ASSIGNORS TO MORGAN & WRIGHT, A CORPORATION OF MICHIGAN.

METHOD OF MANUFACTURING TIRES.

1,226,236.   Specification of Letters Patent.   Patented May 15, 1917.

No Drawing. Continuation of application Serial No. 868,031, filed October 22, 1914. This application filed January 22, 1916. Serial No. 73,540.

*To all whom it may concern:*

Be it known that we, ERWIN E. A. G. MEYER and GEORGE W. SEIBERLING, both citizens of the United States, and residents of Detroit, county of Wayne, and State of Michigan, have invented certain new and useful Improvements in Methods of Manufacturing Tires, of which the following is a full, clear, and exact description.

This invention relates to the manufacture of pneumatic tires and has for its primary object to provide a method for making tires of superior wearing properties without increasing their cost of manufacture.

This application is a continuation of our former application, filed October 22, 1914, Serial No. 868,031.

A pneumatic tire, or more strictly, a tire casing, is usually composed of numerous parts mostly fiber and rubber, carefully assembled on a core and then vulcanized, thereby forming a solid, unified structure. A very common method, and one concerning the present invention, is not only to support the tire upon its core during the vulcanizing treatment, but also to confine it in a heavy metal mold where it is subjected to the compacting action of the rigid mold sections placed under an hydraulic pressure in some instances of three hundred pounds per square inch, or thereabout.

While fiber and rubber are generally employed as the strength-giving and wear-resisting materials, in the manufacture of tires, there are, nevertheless, many ways of using these materials to form differently constructed tires and this invention has general application to these variously constructed tires. For instance, the fiber component of the tire may be formed into threads or cords and as such may be directly built into the tire to give it its usual approximately U-shaped cross-sectional configuration, or these elements may be woven, braided, or otherwise combined into a fabric, simultaneously with their being suitably formed to assume the desired cross-sectional configuration of the tire, or they may be assembled to form tape which may be suitably wound to produce the required U-shape cross-section, or they may be woven, braided, etc., so that they will assume a flat sheet which may be shaped to give the desired cross-section. That is to say, the fiber component may be built into the tire in any preferred or well known manner, and our process is found advantageous to obviate the evils existing in the usual method of vulcanization.

For the purpose of illustration, however, a single type of tire will be considered and the application of the method to other types will at once be apparent. The type of tire to be referred to is the common type which contains several superimposed plies of fabric having intervening layers of rubber. While tires of this type contain various other parts and differ more or less in particular instances, they however, are characterized by having the above mentioned superimposed plies of fabric and intervening layers of rubber, and it is in connection with this feature of the tire that the advantages of the present invention are most pronounced.

The tire is built up of its various plies of fabric and rubber upon a ring core so that when completed it forms a unitary structure. It is then confined in the mold and subjected to the compacting action of its rigid walls under an hydraulic pressure of about three hundred pounds per square inch, during which period it is vulcanized. Thus the tire as usually manufactured passes through three important stages, namely, that of assembling the various parts upon a ring core thereby forming a unitary structure; that of subjecting the unified tire to the action of rigid mold walls under a very great pressure thereby compacting the structure; and lastly, that of performing the vulcanization while under this pressure thereby solidifying the structure. The tire as finally completed is thus composed of a very solid, compact, unitary wall.

There are, however, objectionable results following the action of the rigid mold sections upon the tire in the methods commonly pursued, which it is the object of this invention to overcome. The fiber component of the tire being incased between the rigid iron core and mold, is subjected to the very injurious crushing action of the excessive pressure applied to the mold sections. The injurious effects of this crushing pressure are especially noticeable in the usual type of tire, wherein the layers of fabric are cut from heavy duck of comparatively close weave. This necessitates a correspondingly abrupt high crimp in the threads composing the weave, thereby presenting a structure that is easily injured by the compacting pressure applied to the mold sections.

Furthermore, the tire is maintained under the influence of the mold pressure during the entire vulcanizing period, and no provision is made for correcting any defective assembling of the various parts that may have occurred in the building of the tire upon the ring core.

The present invention is intended to prevent the crushing effect of the mold upon the fiber of the tire and to provide means whereby a readjustment of the component parts of the tire is made possible after the tire has been built up upon its core and previous to its subjection to the action of the molds, so that any defect created by imperfectly assembling the parts may be corrected. The invention further contemplates the provision of means for permanently maintaining the component parts of the tire in their readjusted state, so that when the tire is later subjected to the action of the mold sections they can have no detrimental effect.

The fabric usually employed in constructing tires of the common type comprises strips of duck cut on the bias of a width sufficient to span the core and reach to the beads or edge portions. The ends of the cords composing the weave of the bias-cut fabric lie in lines oblique to the plane of the core and are firmly secured in the bead or end portions of the tire. In an ideal tire the cords would span the tire through the shortest distance between their ends. There would then be no slack in the cords and of course no chance for them to stretch or straighten out when the tire was inflated and the load put upon it.

As a matter of fact, however, the above condition does not exist. The diameter of the core gradually decreases from the crown toward the beads and to apply a straight strip of fabric over such a shaped surface necessitates appropriate stretching and fulling of the fabric, so that it will accommodate itself to the varying circumferences composing the surface of the core. In a 34x4 inch tire the maximum difference of the circumferences is approximately 22⅜ inches. It will thus be seen that to apply a flat sheet of fabric smoothly upon a ring core of this size necessitates stretching and fulling of the plies to provide for this maximum difference in the circumferences. This results in a decided distortion of the weave so that the ideal conditions are far from being realized. The plies of fabric are usually applied by giving them a maximum amount of longitudinal stretch at the crown of the tire, which may be about fifteen per cent., and then gradually decreasing the stretch toward the bead portions until a point is reached where there is no stretch. From this point on the plies are stretched transversely or fulled together by increasing amounts until the beads or edges of the tire are reached.

The longitudinal stretch given the fabric causes the normally square mesh composing the weave to assume an elongated or diamond-shaped configuration. This is most pronounced at the crown of the tire where the stretch is the greatest and gradually decreases downwardly until the point of no stretch is reached and the square mesh is maintained. From this point on the fulling in or transverse stretching of the fabric causes the squares to elongate in a transverse direction which gradually increases toward the beads. This distortion of the weave causes the threads of the fabric to assume a tortuous or zig-zag path, and instead of assuming the shortest distance from end to end, they zig-zag back and forth, thus requiring an excess of cord which acts in the nature of slack and naturally weakens the tire.

The tension produced in the cords when the tire is inflated, tends to straighten them out, thereby causing a relative movement between the cords. The vulcanized rubber is intended to bind the cords permanently together and this relative movement tends to tear them away from the rubber, thereby separating the plies from one another. The relative movement of the cords furthermore produces a chafing action with a corresponding wearing away of the fibers. This is gradual at first, but the fiber and rubber which is worn away assume the form of a powder which is entrapped in the wall of the tire and produce a grinding action on the adjacent material which increases the destructive action until the tire gives way entirely. Moreover, the cords do not straighten uniformly so that the load supported by the tire is not distributed uniformly and the cords that are supporting the greater part of the load will naturally give way first.

The foregoing are some of the evils which seem to necessarily exist in tires composed of plies of fabric having obliquely disposed threads or cords. These conditions exist even in the tire where the utmost care is taken regarding the laying on of the fabric. To reduce these defects to a minimum, it is necessary that the highest degree of attention be paid to the laying of the plies of fabric on the core in the most uniform manner, so that a minimum amount of inequality in stretch and fullness and corresponding misplacement of the fabric will exist.

In actual practice, however, it has been found impossible to apply the layers of fabric so that the stretching and fulling thereof will be uniform about the circumference and possess the required gradual variation from the crown to the bead. That is to say, it has been found impossible to shape the fabric to the core without misplacing or unequally tensioning or distorting the threads or cords to a greater or less extent. It will readily be appreciated that any unequal stretching or fulling of the plies produces a corresponding displacement of the cords from the positions of greatest efficiency and when the component parts of the tire are finally and permanently fixed in these relatively misplaced positions by the vulcanizing process, these inequalities produce unequal internal stresses in the tire so that the load will not be supported by the fabric uniformly throughout the tire. The parts supporting the greater load naturally wear out first, and the life of the tire is thereby correspondingly shortened.

Our invention is directed to improving these conditions, that is to say, our invention is directed toward producing a uniformity of conditions after the plies have been laid upon the core, and after this uniformity has been obtained our invention further contemplates permanently maintaining this uniformity, so that it will not be impaired by the subsequent pressure of the rigid molds to which the tire is subjected during the final vulcanization, and whereby the fiber composing the fabric will not be detrimentally affected by the crushing tendency of this pressure.

In the carrying out of our process the type of tire above referred to is built of the plies of fabric and rubber compound upon a ring core in any usual or preferred manner, except that there is not the same necessity for using the high degree of skill as heretofore, so that a cheaper class of labor may be employed. The fabric being rather stiff or resilient offers some resistance to being shaped to the ring core and were it free to do so would naturally spring back, or recoil partially or wholly to its normal flat condition when released. The rubber gum between the plies of fabric however, being cold or at atmospheric temperature has ample tenacity to hold the plies exactly where they are put by the workman who builds the tire, so that whatever misplacement there may be in the fabric which is produced by unequal stretching or fulling while assembling the parts is maintained by the adhesion between the fabric and rubber.

After the tire has been finally built upon its core it is subjected to the action of a heating medium and the temperature of the rubber raised to the vulcanizing point. This reduces the rubber to a semi-liquid or viscous condition and causes it to temporarily lose practically all of its adhesive properties and its effective hold upon the fabric. This step is carried out while the tire is still free from the influence of the compacting action of the mold sections. The fabric being thus released by the rubber is free to readjust itself so that whatever unequal strains and resultant misplacement of the fabric may have been produced during the building of the tire will disappear and uniform conditions be produced in the individual threads and also within and between the several plies composing the tire.

After the plies of fabric have had sufficient time for their necessary readjustment and equalization of tension vulcanization begins. This step is continued until the tire is sufficiently vulcanized to maintain the parts in their readjusted, equalized condition with sufficient strength to withstand the injurious effects of the compacting pressure of the mold sections when finally applied. While this partial curing step is not confined to the employment of any particular heating medium we have produced very satisfactory results by the employment of steam.

This partial-vulcanizing step is carried out while the tire is unconfined by rigid walls and the heat produced is therefore likely to cause the rubber stock to blow and the plies to separate. To prevent this and at the same time to permit a ready readjustment of the fabric parts of the tire the partial-vulcanization is preferably carried out while the tire is subjected to a fluid pressure. Satisfactory results have been obtained in this regard by partial-vulcanizing the tire in a closed vulcanizer under a steam pressure of approximately thirty-five pounds for a period of twenty to twenty-five minutes depending upon the size of the tire. This step is found especially advantageous in the case of large tires where the tendency to blow is more manifest.

After the tire has been partially-vulcanized it is placed in the mold and subjected to final vulcanization, the mold sections being placed under the desired hydraulic pressure which may in some cases reach approximately three hundred pounds per square inch. The partially-vulcanized rubber forms a very strong bond between the cords and plies of fabric so that they will maintain their readjusted positions throughout the final cure, and the rubber will be of sufficient stiffness to form a cushion for the cords composing the fabric, so that the compacting pressure of the mold sections will have no tendency to crush the fiber composing them. It is advantageous to subject certain tires to a preliminary warming up process previous to applying the partial-vulcanizing heat. This gives the cords and plies of fabric a better opportunity to attain the desired readjustment. A temperature of 212° F. for a period of fifteen minutes has been found satisfactory in cases where preheating has been deemed advantageous.

The present manner of carrying out our process has necessitated the removal of the partially-cured tires from the vulcanizer or heater in order to place them within the molds preparatory to the final vulcanizing step. The partial-vulcanizing as before mentioned is preferably carried out under a steam pressure of about thirty-five pounds, and if this is materially lowered without correspondingly lowering the temperature of the tire it would result in some instances in the tire blowing to a harmful extent. Therefore when the partial-vulcanization is completed and the tires are to be removed they are treated to a cooling process while the pressure in the vulcanizer is maintained, or at least is only reduced gradually as the stock is cooled. This cooling under a sufficient pressure may be attained by shutting off the steam supply and passing cold air under pressure through the vulcanizer, thereby driving out the steam with the exit of the air, care being taken that this exit be regulated so that the required air pressure may be maintained. Finally the tires will be sufficiently cooled to permit a reduction of the pressure to atmosphere whereupon they may be removed from the vulcanizer and subjected to the final vulcanization treatment. This step of cooling under pressure may be resorted to in all cases where our method is employed. It is especially advantageous where there is much rubber as at the tread portion of a tire, but where only the carcass is subjected to our process there will not be the same need for this cooling under pressure, and if desired it may be dispensed with.

While particular attention has been given to the common type of tire in describing our method, it is not limited to any special type, nor to the employment of any special style of core, but may be used in any instance wherein the tire in its completed state will have been benefitted by its employment.

Having described our invention, what we claim and desire to protect by Letters Patent is:

1. The method of manufacturing tires which consists in making the carcass of thread or cord associated with rubber annular and substantially U-shaped in cross-section, subjecting such annular structure to the action of heat to cause the rubber component to soften and thereby lessen its function of holding the threads or cords, whereby the threads or cords are free to adjust themselves with respect to conditions of tension and relationship with one another, and completing the process by vulcanization under the compacting pressure of rigid mold members.

2. In the manufacture of tires, the method which consists in assembling the fibrous parts with rubber upon a ring core, the rubber serving to hold the fibrous parts in their assembled positions, heating the structure thus formed until the rubber loses its effective hold leaving the fibrous parts free to readjust themselves, maintaining the heat at the vulcanizing temperature after the readjustment of the parts until the rubber is partly vulcanized to a sufficient extent to cushion the fibrous parts and to permanently maintain the readjustment, subjecting the structure to the action of rigid mold sections placed under a compacting pressure, and while thus subjected completing the vulcanization.

3. In the manufacture of tires, the method which consists in assembling the fibrous parts with rubber upon a ring core, the rubber serving to hold the fibrous parts in their assembled positions, simultaneously subjecting the structure thus formed to a fluid pressure and to heat until the rubber loses its effective hold leaving the fibrous parts free to readjust themselves, maintaining the heat at the vulcanizing temperature after the readjustment of the parts until the rubber is partially-vulcanized to a sufficient extent to cushion the fibrous parts and to permanently maintain the readjustment, subjecting the structure to the action of rigid mold sections placed under compacting pressure, and while thus subjected completing the vulcanization.

4. In the manufacture of tires, the method which consists in assembling the fibrous parts with rubber upon a ring core, the rubber serving to hold the fibrous parts in their assembled positions, simultaneously subjecting the structure thus formed to a fluid pressure and to heat until the rubber loses its effective hold leaving the fibrous parts free to readjust themselves, maintaining the heat at the vulcanizing temperature after the readjustment of the parts until the rubber is partially vulcanized to a sufficient extent to cushion the fibrous parts and to permanently maintain the readjustment, cooling the structure under pressure, subjecting the structure to the action of rigid mold sections placed under compacting pressure, and while thus subjected completing the vulcanization.

5. In the manufacture of tires, the method which consists in assembling the fibrous parts with rubber upon a ring core the rubber serving to hold the fibrous parts in their assembled positions, subjecting the structure thus formed to a preliminary heating below the vulcanizing point and then raising the temperature to the vulcanizing point thereby destroying the effective hold of the rubber on the fibrous parts and leaving said parts free to readjust themselves, maintaining the heat at the vulcanizing temperature after the readjustment of the parts until the rubber is partly vulcanized to a sufficient extent to cushion the fibrous parts and to permanently maintain the readjustment; subjecting the structure to the action of rigid mold sections placed under a compacting pressure, and while thus subjected completing the vulcanization.

6. In the manufacture of tires, the method which consists in assembling the fibrous parts with rubber upon a ring core the rubber serving to hold the fibrous parts in their assembled positions, subjecting the structure to the heat and pressure of steam at approximately thirty-five pounds for twenty to twenty-five minutes until partial vulcanization is effected, subjecting the structure to the action of rigid mold sections placed under compacting pressure, and while thus subjected completing the vulcanization.

7. In the manufacture of tires, the method which consists in assembling the fibrous parts with rubber upon a ring core, the rubber serving to hold the fibrous parts in their assembled positions, subjecting the structure thus formed to a preliminary heating at about 212° F. and then raising the temperature to the vulcanizing point for destroying the effective hold of the rubber on the fibrous parts and leaving said parts free to readjust themselves, maintaining the heat at the vulcanizing temperature after the readjustment of the parts until the rubber is partly vulcanized to a sufficient extent to cushion the fibrous parts and to permanently maintain the readjustment; subjecting the structure to the action of rigid mold sections placed under a compacting pressure, and while thus subjected completing the vulcanization.

8. The method of manufacturing tires which consists in making the carcass of thread or cord associated with rubber annular and substantially U-shaped in cross-section, subjecting such annular structure to the action of heat to cause the rubber component to soften and thereby lessen its function of holding the threads or cords, whereby the threads or cords are free to adjust themselves with respect to conditions of tension and relationship with one another, cooling the structure, and completing the process by vulcanization under the compacting pressure of rigid mold members.

9. The method of manufacturing tires which consists in making the carcass of thread or cord associated with rubber annular and substantially U-shaped in cross-section, subjecting such annular structure to the action of heat to cause the rubber component to soften and thereby lessen its function of holding the threads or cords, whereby the threads or cords are free to adjust themselves with respect to conditions of tension and relationship with one another, cooling the structure under pressure, and completing the process by vulcanization under the compacting pressure of rigid mold members.

10. The process of manufacturing tires which consists of assembling component rubber and fibrous material of the tire, maintaining the surface thereof unconfined, subjecting the same to the action of steam in direct contact with said unconfined surface, bringing said steam to the vulcanizing temperature and holding it at said temperature for a sufficient period to partially vulcanize the article, and subsequently completing formation and vulcanization of the article.

11. The process of manufacturing tires having a carcass and a tread, consisting of first assembling the carcass materials, then partially curing the same in the absence of distorting pressure, then applying the tread to the carcass, and finally vulcanizing the product under compacting pressure.

12. In the manufacture of tires, the method which consists in assembling the fibrous parts with rubber, the rubber serving to hold the fibrous parts in their assembled positions, heating the structure thus formed until the rubber loses its effective hold leaving the fibrous parts free to readjust themselves, maintaining the heat at the vulcanizing temperature after the readjustment of the parts until the rubber is partly vulcanized to a sufficient extent to cushion the fibrous parts and to permanently maintain the readjustment, cooling the structure, subjecting the structure to the action of rigid mold sections placed under a compacting pressure, and while thus subjected completing the vulcanization.

Signed at Detroit, Mich., this 17th day of January, 1916.

ERWIN E. A. G. MEYER.
GEORGE W. SEIBERLING.